United States Patent
Serr et al.

(10) Patent No.: US 8,930,828 B2
(45) Date of Patent: Jan. 6, 2015

(54) DISTINGUISHING CONFERENCE PARTICIPANTS

(75) Inventors: Robert Serr, Kirkland, WA (US); Scott Alan Huddleston, Redmond, WA (US); Mark McClelland, Seattle, WA (US); Mark Timothy Madsen, Morton Grove, IL (US); Allyson Straka, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1428 days.

(21) Appl. No.: 12/143,818

(22) Filed: Jun. 22, 2008

(65) Prior Publication Data

US 2009/0319912 A1 Dec. 24, 2009

(51) Int. Cl.
- *G06F 3/00* (2006.01)
- *H04M 3/56* (2006.01)
- *H04L 12/18* (2006.01)
- *H04L 12/58* (2006.01)

(52) U.S. Cl.
CPC ........... *H04M 3/567* (2013.01); *H04L 12/1827* (2013.01); *H04L 12/5815* (2013.01); *H04L 51/043* (2013.01); *H04M 2203/5072* (2013.01)
USPC .............................. 715/753; 715/751; 715/758

(58) Field of Classification Search
USPC .......................................................... 715/753
See application file for complete search history.

(56) References Cited

U.S. PATENT DOCUMENTS

| | | | |
|---|---|---|---|
| 5,949,414 A * | 9/1999 | Namikata et al. .............. | 715/753 |
| 6,061,716 A * | 5/2000 | Moncreiff ...................... | 709/204 |
| 6,931,113 B2 * | 8/2005 | Ortel .......................... | 379/202.01 |
| 7,010,569 B2 | 3/2006 | Okayasu et al. | |
| 7,284,002 B2 * | 10/2007 | Doss et al. ............................. | 1/1 |
| 7,533,146 B1 * | 5/2009 | Kumar .......................... | 709/205 |
| 7,599,990 B1 * | 10/2009 | Groves et al. .................. | 709/204 |
| 7,702,728 B2 * | 4/2010 | Zaner et al. ................... | 709/205 |
| 7,702,731 B2 * | 4/2010 | Lingafelt et al. .............. | 709/205 |
| 7,756,675 B2 * | 7/2010 | Kondo et al. .................. | 702/179 |
| 2002/0019829 A1 * | 2/2002 | Shapiro ......................... | 707/201 |
| 2003/0065788 A1 | 4/2003 | Salomaki | |
| 2004/0039780 A1 * | 2/2004 | Ho et al. ........................ | 709/205 |
| 2004/0064567 A1 * | 4/2004 | Doss et al. .................... | 709/228 |
| 2004/0114735 A1 * | 6/2004 | Arning et al. .............. | 379/93.24 |
| 2004/0122683 A1 * | 6/2004 | Grossman et al. ................. | 705/1 |

(Continued)

OTHER PUBLICATIONS

"WebMessenger Mobile IM Service", retrieved at <<http://www.webmessenger.com/docs/WM_Service_Data_Sheet_2005-03-11.pdf>>, pp. 2, Mar. 11, 2005.

(Continued)

*Primary Examiner* — Stephen Alvesteffer
(74) *Attorney, Agent, or Firm* — Andrew Smith; Jim Ross; Micky Minhas (57) ABSTRACT

Technologies are described herein for distinguishing between conference participants associated with different groups. A communication is received from a participant during a conference. The participant's group affiliation is determined and a representation attribute corresponding to the group is used to render the communication within the conference. As a result, the communications from participants of like groups are displayed with like representation attributes to visually distinguish the communications according to group affiliations. An administrator may designate the representation attributes so that all of the communications from participants of the same group are similarly distinguished without action from the participants. Participants may filter the communications as desired according to the groups and corresponding representation attributes.

19 Claims, 8 Drawing Sheets

(56) References Cited

U.S. PATENT DOCUMENTS

| | | | |
|---|---|---|---|
| 2005/0044159 A1 | 2/2005 | Niemi et al. | |
| 2005/0069116 A1 | 3/2005 | Murray | |
| 2005/0210104 A1 | 9/2005 | Torvinen | |
| 2005/0210113 A1 | 9/2005 | Kasuga et al. | |
| 2006/0059431 A1* | 3/2006 | Pahud | 715/751 |
| 2006/0195587 A1 | 8/2006 | Cadiz et al. | |
| 2007/0172047 A1* | 7/2007 | Coughlan et al. | 379/202.01 |
| 2007/0239869 A1 | 10/2007 | Raghav et al. | |
| 2008/0034040 A1* | 2/2008 | Wherry et al. | 709/204 |
| 2008/0068206 A1 | 3/2008 | Chakravarty et al. | |
| 2008/0091692 A1* | 4/2008 | Keith et al. | 707/100 |
| 2008/0229214 A1* | 9/2008 | Hamilton et al. | 715/751 |
| 2012/0005611 A1* | 1/2012 | Wey et al. | 715/771 |

OTHER PUBLICATIONS

"The Power of Presence", White Paper, Jabber Inc., 2006, pp. 1-10.

"Unified Communications", 2008, Avaya Inc., pp. 3.

"WebMessenger Mobile IM Service", downloaded Apr. 25, 2008 from http://www.webmessenger.com/docs/WM_Service_Data Sheet2005-03-11.pdf, 2 Pages.

* cited by examiner

DISTINGUISHING CONFERENCE PARTICIPANTS

BACKGROUND

People often communicate with one another in messaging conferences that include large numbers of participants. Examples include text conferences, group chats, instant messaging meetings and other unified communications conferences. These conferences can include an extremely large number of communications from any number of participants. This is particularly true during long-run conversations such as persistent chat rooms.

In many instances, conference participants are related in that they work within, or belong to, common groups. For example, a conference may include participants from marketing, sales, product support, and management. A person who is monitoring and/or actively participating in a conference may have difficulty distinguishing between participants, or groups of participants, at a glance without having to read the participants' names or the associated communications. There is no current method for a person to quickly identify communications from one particular group, such as communications from marketing personnel, so that all communications from any marketing personnel are similarly configured and identifiable.

It is with respect to these considerations and others that the disclosure made herein is presented.

SUMMARY

Technologies are described herein for distinguishing conference participants. In particular, the disclosure provided herein enables the visual identification of groups of participants within a unified communications conference. By visually distinguishing communications from various groups of participants, any participant or other person monitoring the conference gains the ability to quickly identify and prioritize the communications that may be of interest.

According to one aspect presented herein, a communication is received from a participant. If the participant is associated with any particular group, that group affiliation is determined. The group is designated with a representation attribute that will distinguish all communications from participants of the group. The communication that is received from the participant is then rendered with the representation attribute to identify the participant and corresponding communication as being associated with the group. According to various implementations, the representation attribute may include a color, a specific font or text formatting, and/or an icon.

According to another aspect of the disclosure provided herein, a conference participant is associated with a group. Extended presence information that is associated with the participant is maintained and may include a representation attribute identifying the group. The extended presence information and representation attribute is published for use by a client application in rendering communications from the participant with the representation attribute.

According to yet another aspect, a communication from a conference participant is received. Extended presence information is retrieved and used to determine a group with which the conference participant is associated and to determine a representation attribute to be used to identify the communication as originating from a participant within the group. The communication is then rendered with the representation attribute to distinguish it from communications from other groups. According to one implementation, communications can be filtered according to the groups from which they originate, as defined by a filtering rule.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for distinguishing communications from conference participants of a unified communications conference. Through the use of the technologies and concepts presented herein, a conference participant or person monitoring a conference is able to visually identify a group affiliation of a conference participant utilizing one or more representation attributes applied to the associated communications.

Specifically, an administrator is able to assign one or more representation attributes to a participant group. According to various embodiments, these attributes are stored along with extended presence data and published by a communications server. When a client communications application retrieves the extended presence data for display, the representation attributes are also retrieved and utilized to distinguish communications according to the group to which the corresponding conference participant belongs. The group memberships are determined using an active directory that includes the relationships between participants and different groups. Because a participant may belong to more than one group, a hierarchy of group memberships is established and utilized to determine which representation attribute to utilize according to the group membership having the highest priority.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for distinguishing conference participants will be described. Throughout this disclosure, the term "conference" is used to describe a forum in which participants may exchange messages, applications, files, and any other communications in which an indication of a communication is displayed for a receiving participant. For example, a typical conference may be displayed as a sequential listing of communications as they are received, showing the subject, author or participant that drafted the communication, and the date and time that the communication was received.

Figure 1:
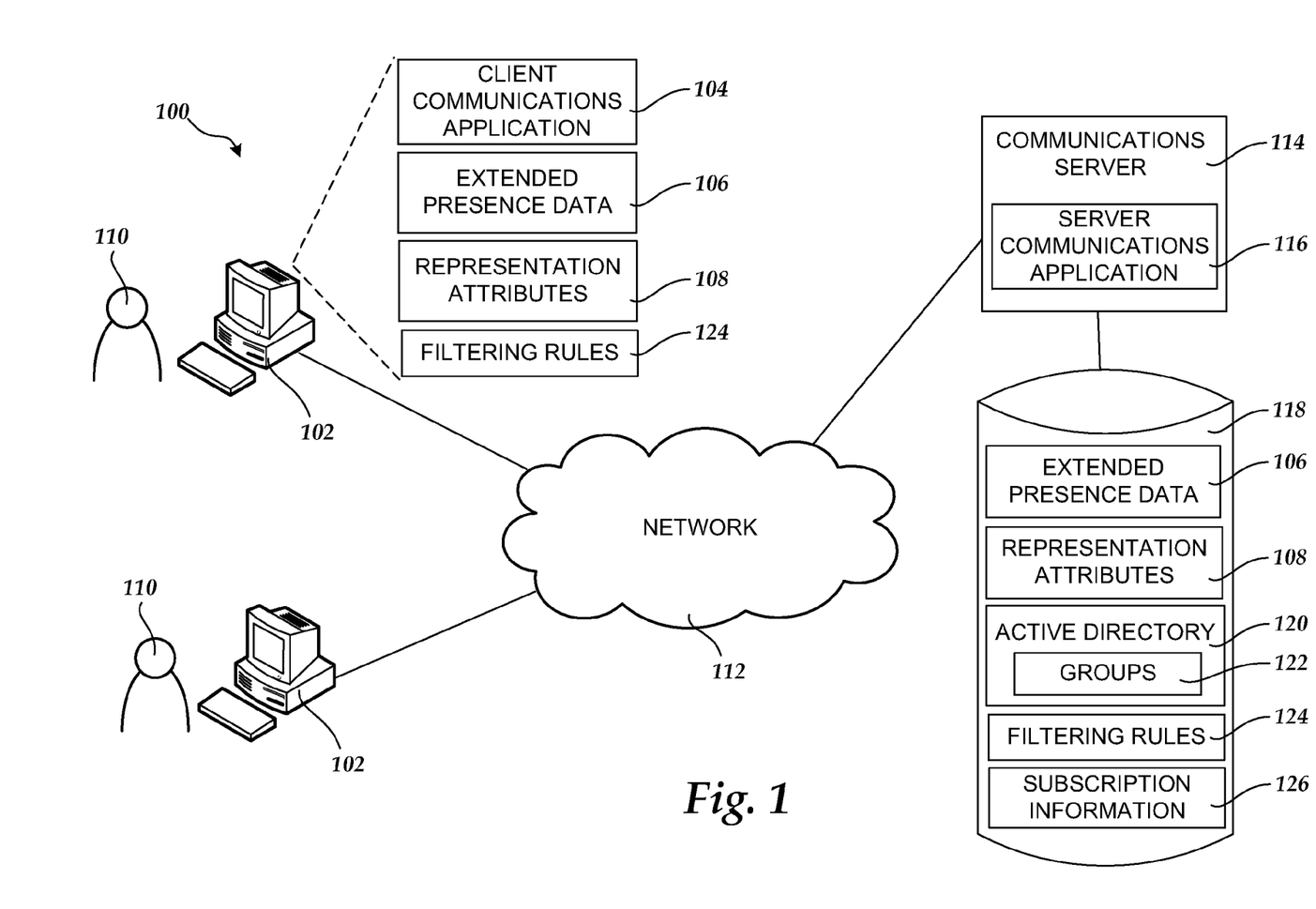
FIG. 1 is a network diagram showing aspects of an illustrative operating environment and several software components provided by the embodiments presented herein.

Turning now to FIG. 1, details will be provided regarding an illustrative operating environment and several software components provided by the embodiments presented herein. In particular, FIG. 1 shows aspects of a system 100 for exchanging communications and distinguishing between conference participants. The system 100 includes any number of computing devices 102. According to one embodiment, the computing device 102 illustrated in FIG. 1 comprises a standard desktop or laptop computer system capable of executing an operating system and one or more application programs. In particular, according to embodiments, the computing device 102 is operative to execute a client communications application 104. The client communications application 104 may be an application program, program module, or set of application programs or program modules capable of sending and receiving communications and performing the various processes according to the embodiments described herein.

As will be described in further detail below, the client communications application 104 utilizes extended presence data 106 to display current presence information for participants of a conference. The client communications application 104 additionally applies representation attributes 108 to applicable communications to designate a group to which the sending conference participant belongs. This process will be described in detail below with respect to FIGS. 2-7. Conference participants 110 communicate with one another through one or more local and wide area networks, such as the network 112. It should be appreciated that any number of conference participants 110, utilizing any number of computing devices 102, may be communicating with one another utilizing the concepts described herein.

A communications server 114 facilitates the conference utilizing a server communications application 116. The server communications application 116 may be an application program, program module, or set of application programs or program modules capable of providing communications functionality to the client communications application 104, such as instant messaging, presence, audio/video conferencing, and web conferencing. One example of a client communications application 104 and a server communications application 116 includes MICROSOFT OFFICE COMMUNICATOR and MICROSOFT OFFICE COMMUNICATIONS SERVER, respectively, from Microsoft Corporation of Redmond, Wash.

The server communications application 116 stores and utilizes data within a data repository 118. It should be appreciated that the data repository 118 may be any type of storage medium remotely or directly connected to the communications server 114 or residing within the communications server 114. The system 100 may additionally include more than one data repository 118. The data repository 118 stores data that defines the type of information that a conference participant 110 and how the data will be rendered on the display of the computing device 102.

The data stored at the data repository 118 includes extended presence data 106, which indicates a participant's current communication status. Typical instant messaging applications may include basic presence data or extended presence data 106. An example of basic presence data includes a representation of a participant 110 in a conference as "on-line" or "off-line." An example of extended presence data 106 includes a cellular telephone number where a participant 110 may be reached when away from the conference, or a message visible only to subscribers of the information stating that the participant is in a particular meeting that will end at a particular time. Because the extended presence data 106 is provided to the communications server 114 by the client communications application 104 on the computing device 102, stored and maintained at the data repository 118, and published by the server communications application 116 for use by the computing devices 102 participating in a communications conference, the extended presence data 106 is shown in FIG. 1 to reside at the computing device 102 as well as at the data repository 118.

Similarly, the representation attributes 108 are shown to be residing at the computing device 102 and the communications server 114. As will be described below, according to various embodiments, the representation attributes 108 are selected by an administrator at the communications server 114 and stored in the data repository 118. The representation attributes 108 may be stored as part of the extended presence data 106 or separately from the extended presence data 106. The representation attributes 108 are then provided to the computing devices 102 for use in rendering communications from conference participants 110.

Although the representation attributes 108 are described throughout this disclosure as being a part of the extended presence data 106 or as being used in conjunction with the extended presence data 106, it should be understood that the representation attributes 108 may be utilized in the manner described herein without utilizing extended presence data 106 or basic presence data. As will be illustrated in FIGS. 2-4, the representation attributes 108 may include any manner of visually distinguishing communications, including but not limited to, background and foreground color, fonts and text formatting, and/or icons.

The data repository 118 may additionally include an active directory 120. This directory includes information about the various conference participants 110, including the groups 122 to which they are members. Any given conference participant 110 may be associated with any number of groups or classifications of people. For example, a participant 110 may be a member of management, a marketing team, a quality assurance team, and a company softball team. As will be described in greater detail below, embodiments allow for the use of representation attributes 108 to associate a participant 110 and communication with a first group, which may be selected by an administrator, the participant 110, and/or a rendering priority rule that establishes a group hierarchy to use for selection of the first group in any given communication scenario.

Figure 6:
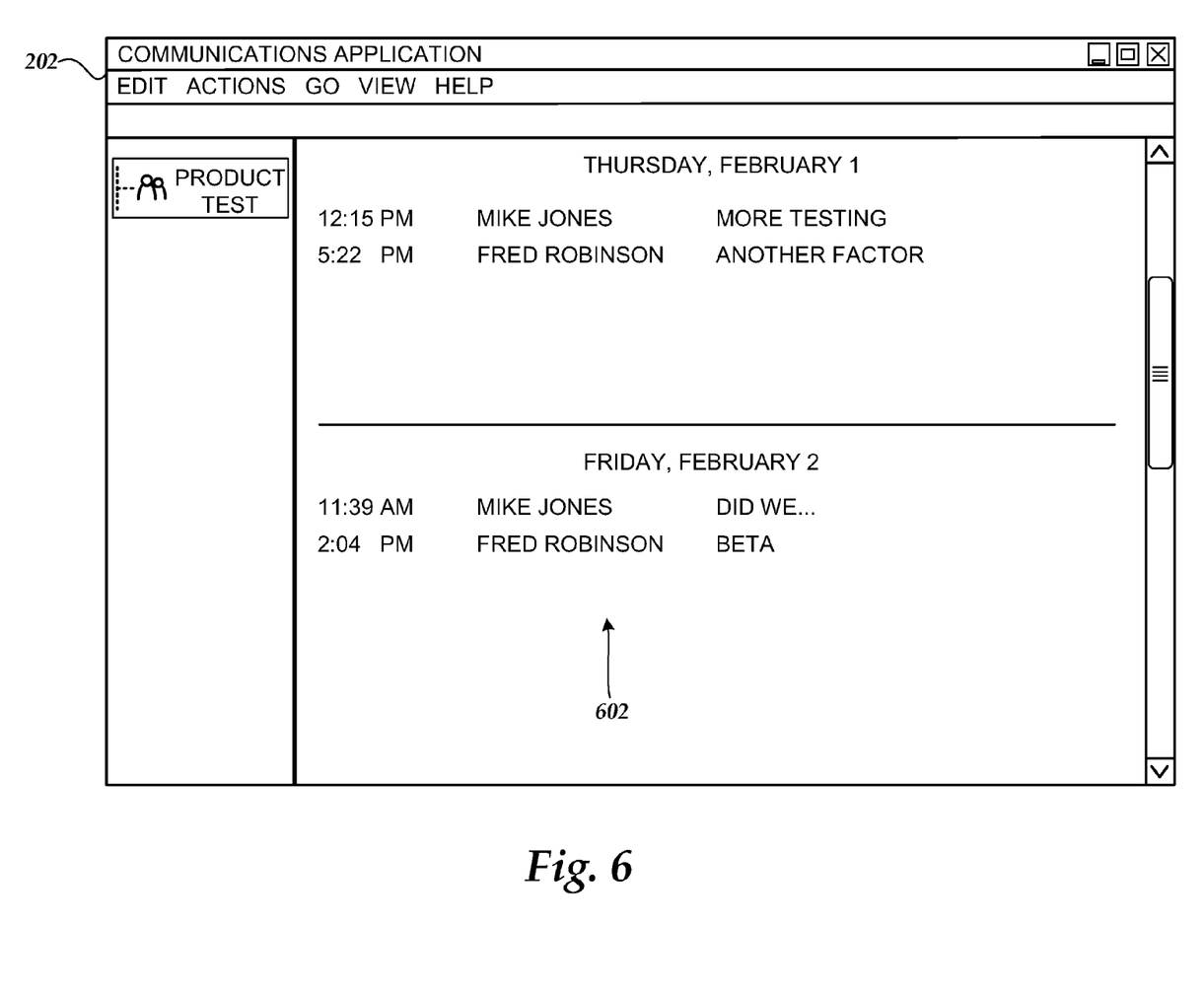
FIG. 6 is a screen diagram showing an illustrative example of filtering conference participant communications according to various embodiments presented herein.

According to one embodiment described below with respect to FIGS. 6 and 7, the communications of various conference participants 110 may be filtered so that only communications from a desired group or groups of participants 110 are displayed. The client communications application 104 and/or the server communications application 116 may utilize one or more filtering rules 124 to achieve the desired filtering. The filtering rules 124 are established by a conference participant 110 and may be stored at either the computing device 102 or the communications server 114.

The data repository 118 may additionally include subscription information 126 that defines the amount and type of information provided to each conference participant 110. For example, a conference participant 110 may subscribe to the extended presence data 106 of a second conference participant 110, but not to the extended presence data 106 of a third conference participant 110. In this situation, the server communications application 116 and the client communications application 104 would provide the extended presence data of the second participant 110 while withholding the extended presence data of the third participant 110 utilizing the subscription information 126.

Figure 2:
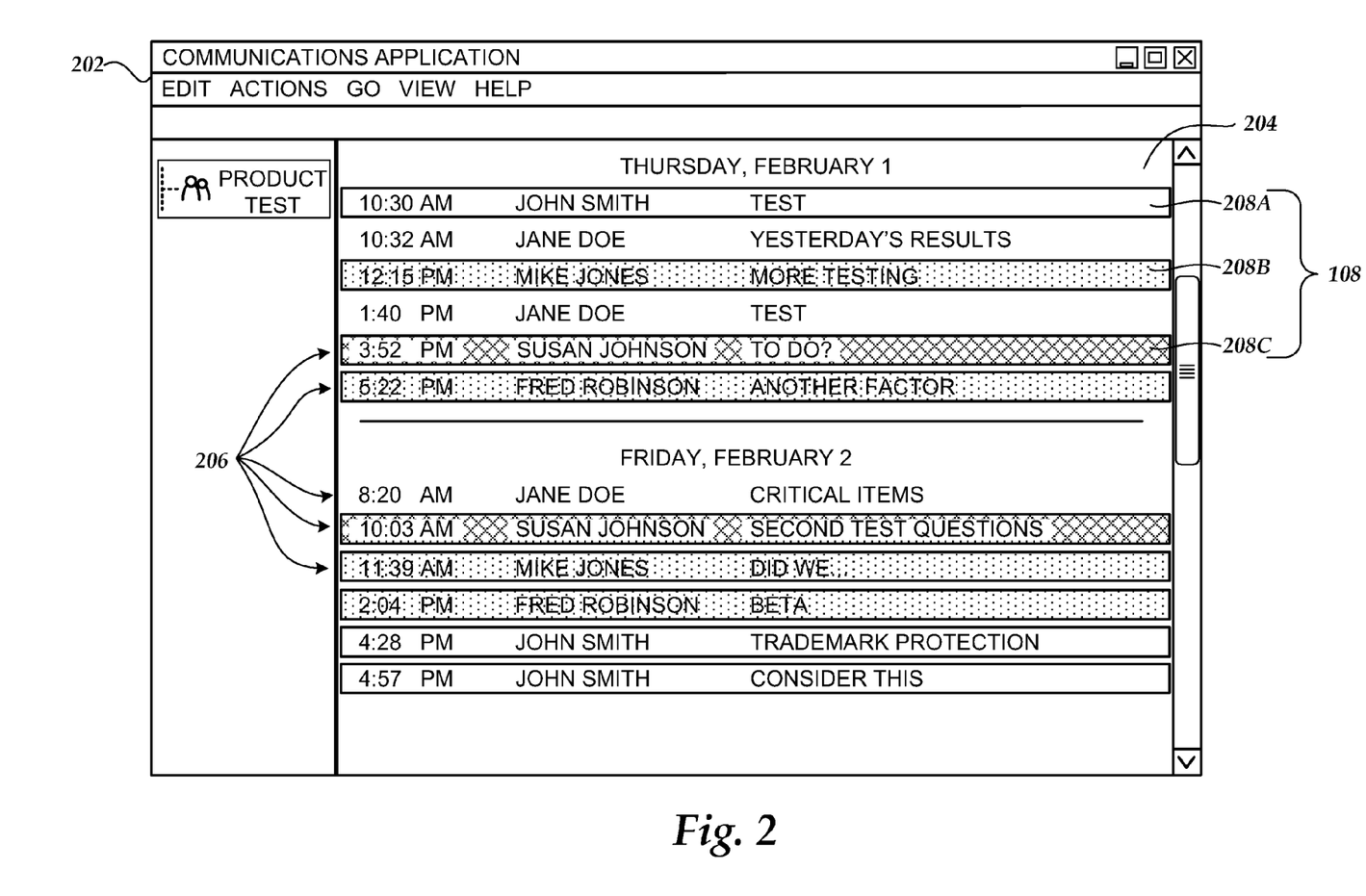
FIG. 2 is a screen diagram showing an illustrative example of distinguishing communications by conference participant groups according to various embodiments presented herein.

Turning now to FIG. 2, an illustrative example of a screen diagram 202 showing a communications conference window 204 according to one embodiment of the disclosure provided herein will be described. According to this example, the communications conference window 204 includes a sequential list of communications 206 that took place in conversations on two separate days. It should be appreciated that the lists of communications 206 shown in FIGS. 2-6 are relatively short and simplistic for clarity. Many communications conferences are substantially more extensive, increasing the benefits of the concepts described herein that allow for quick differentiation between groups of participants 110.

The communications 206 shown in FIG. 2 originate from five different conference participants 110. The five conference participants 110 represent three different groups 122. In this embodiment, the representation attributes 108 that distinguish the groups 122 include colors. As seen, John Smith is a member of a group 122 that is visually distinguished using color 208A. Mike Jones and Fred Robinson are both members of a group 122 that is represented by color 208B. Susan Johnson is affiliated with a group 122 that is represented by color 208C.

In this embodiment, an administrator has associated colors 208A, 208B, and 208C with the three different groups. Once these representation attributes 108 are stored in the data repository 118, they are provided to the client communications applications 104 residing on the various computing devices 102. The client communications applications 104 will then utilize the respective colors when displaying communications from any participant 110 that is a member of the group 122 associated with the representation attributes 108. It should be appreciated that the colors may be used as background colors, foreground colors, or in any manner to designate a particular communication as being associated with the group 122 assigned to the color.

Figure 3:
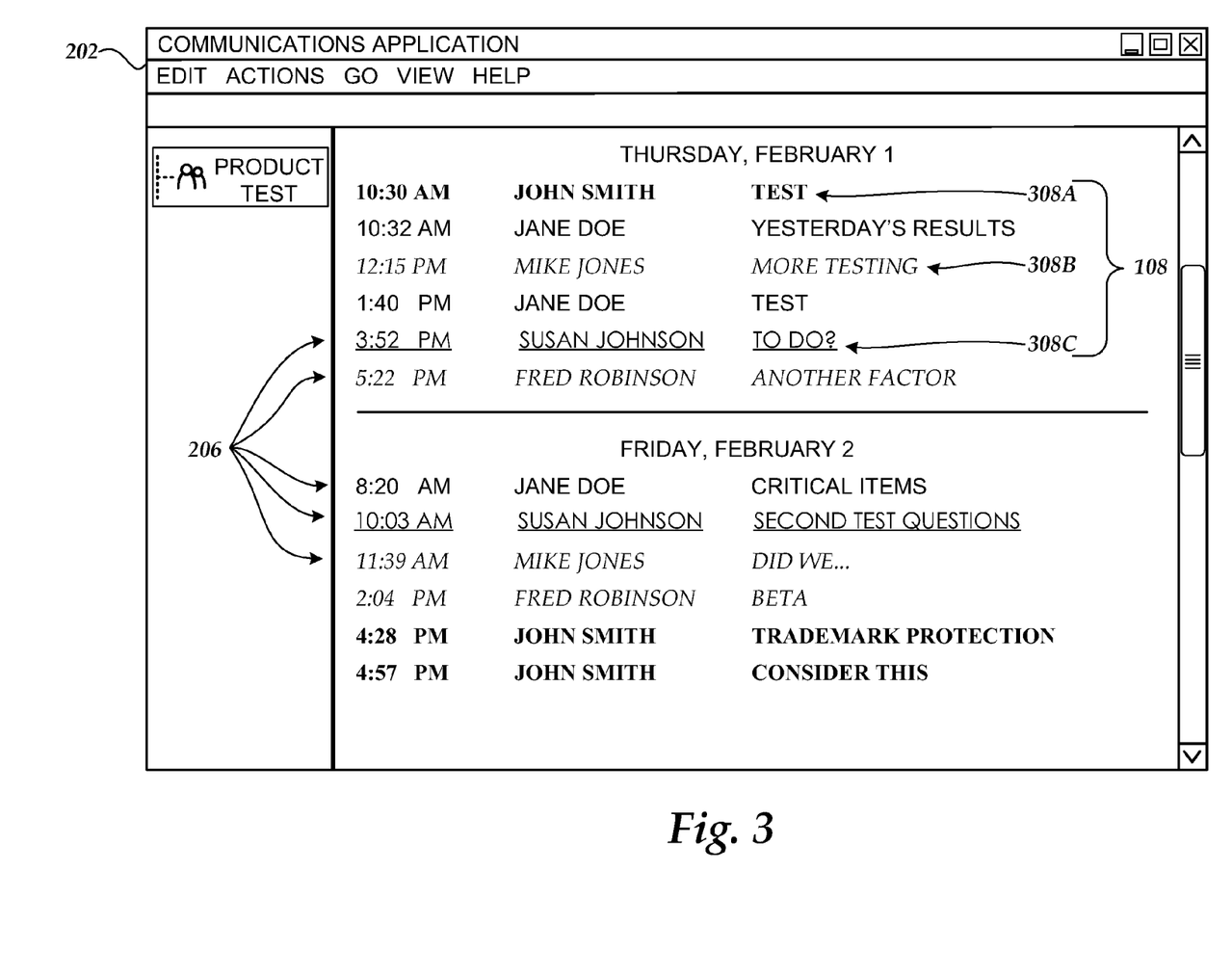
FIG. 3 is a screen diagram showing an alternative example of distinguishing communications by conference participant groups according to various embodiments presented herein.

FIG. 3 shows an alternative embodiment in which the communications 206 are distinguished by groups 122 utilizing representation attributes 108 that include various types of text formatting rather than the use of colors. In this example, format 308A includes a first font that is displayed in bold. Format 308B includes a second font that is displayed in italics. Format 308C includes a third font that is rendered with underlining. It should be appreciated that any type of font may be used with or without additional formatting such as bold, italics, and underlining. Additionally, it should be appreciated that a communication 206 may be represented such that all of the communication 206 or any portion of the communication 206 includes the applicable representation attribute 108.

Figure 4:
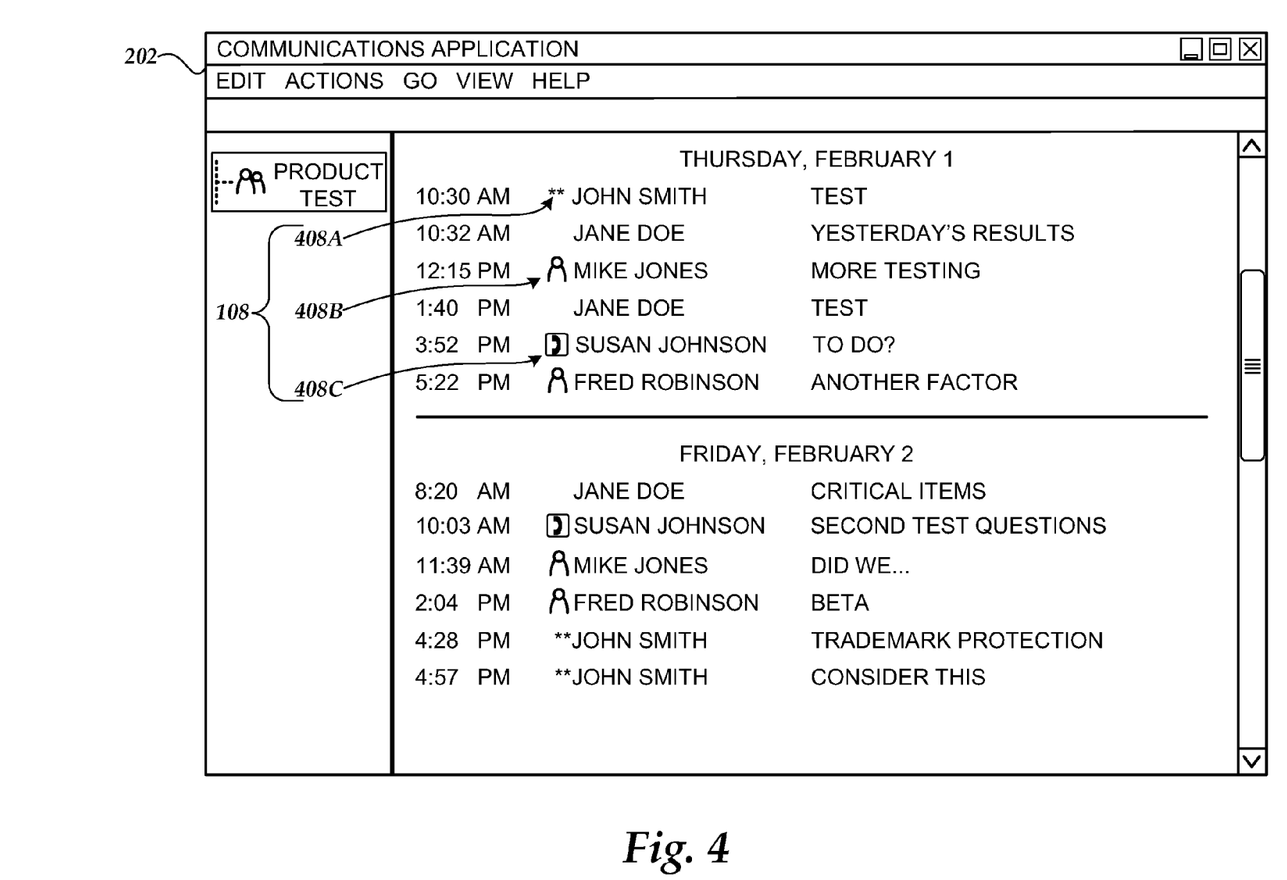
FIG. 4 is a screen diagram showing another alternative example of distinguishing communications by conference participant groups according to various embodiments presented herein.

FIG. 4 shows another alternative embodiment in which the communications 206 are distinguished by groups 122 utilizing icons as representation attributes 108. The three different groups 122 that are easily identifiable are represented by icons 408A, 408B, and 408C. It should be understood that the disclosure provided herein is not limited to the use of colors, text formatting, or icons as representation attributes 108 to distinguish communications. Rather, any type of representation attributes 108 may be used or a combination of representation attributes 108 may be used.

Figure 5:
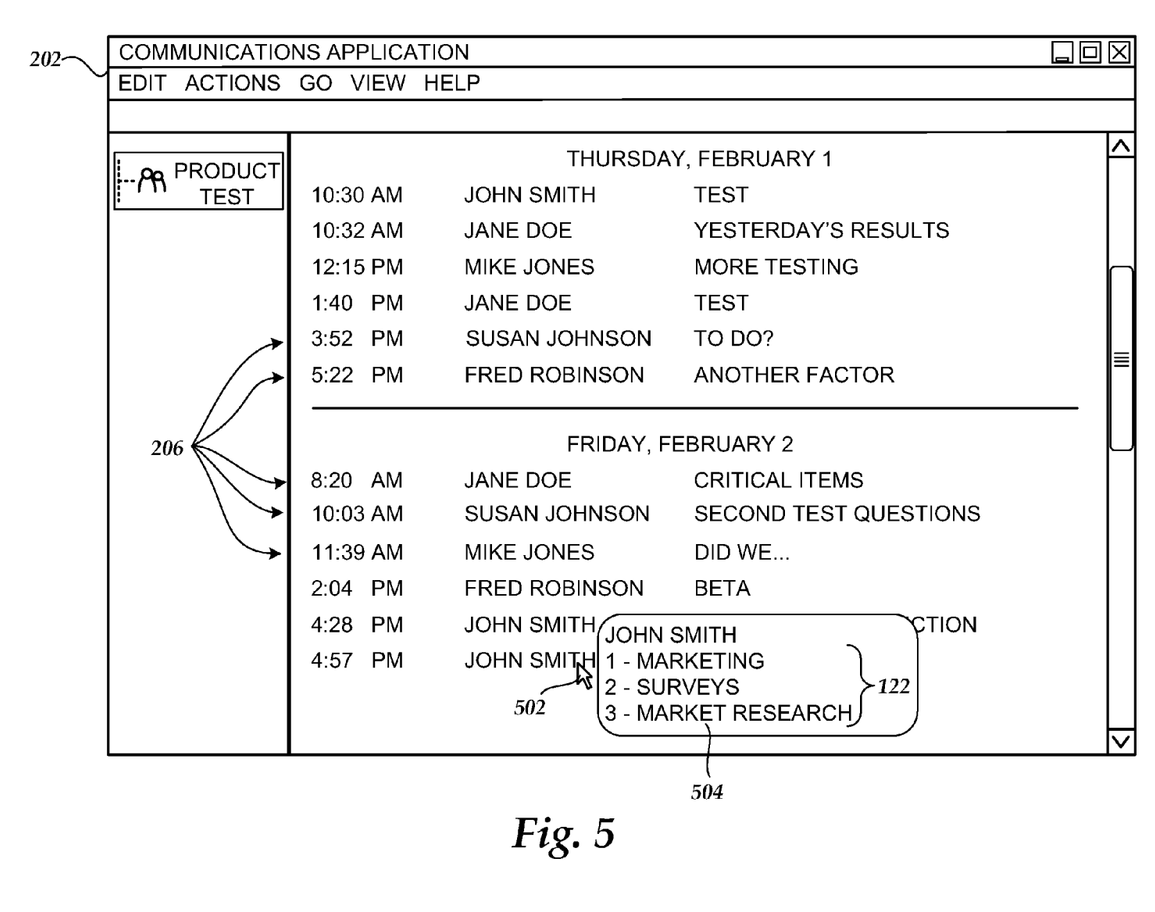
FIG. 5 is a screen diagram showing an illustrative example of displaying conference participant information according to various embodiments presented herein.

Another embodiment for visually identifying one or more groups 122 to which a participant 110 belongs includes displaying this information when a user hovers a cursor over a communication 206. An example of this embodiment is shown in FIG. 5. When the user moves the cursor 502 to a location on or near a communication 206 using a mouse or other input device, an information window 504 is displayed. The information window 504 shows the various groups 122 to which John Smith belongs. According to the example shown, the group is marketing. All communications 206 from John Smith in this conference will be identified using the representation attributes 108 associated with the marketing group, unless other factors dictate otherwise according to a rendering priority rule.

For example, a rendering priority rule established by an administrator or a conference participant 110 may instruct the client communications application 104 to utilize the representation attributes 108 associated with the group 122 that includes the most conference participants 110 currently participating in the conversation. So, communications 206 from John Smith may be identified as originating from the marketing group until other participants 110 join the conference that are members of the surveys group. Once the number of participants 110 that belong too the surveys groups outnumber the participants in the marketing group, then communications 206 from John Smith will be associated with the surveys group.

It should be appreciated that the information displayed within the information window 504 is not limited to the groups 122 associated with the conference participant 110. Any amount and type of information may be displayed when the cursor 502 hovers on or near a communication 206. Once the cursor 502 is moved away from the communication 206, the information window 504 is removed. The information window 504 may be used instead of marking the communications 206 according to representation attributes 108 as described and shown above with respect to FIGS. 2-4 so that the group affiliations are only visible when the cursor 502 is moved on or near a communication 206. Alternatively, the information window 504 may be used in addition to the representation attributes 108 described above in order to display additional information not shown by the representation attributes 108 alone, such as all of the groups 122 to which a particular conference participant 110 is associated. It should be noted that all of the various representation attributes 108 described herein may be used separately or in combination with one another to visually distinguish communications 206 in a desired manner.

As described above, embodiments of the disclosure provided herein may provide for a filtering functionality that allows a conference participant 110 to customize how communications 206 are displayed. FIG. 6 shows one example of this implementation. In this example, the user has established a filtering rule 124 that instructs the client communications application 104 to render only communications 206 from the group 122 represented with color 208B in FIG. 2. As a result, the client communications application 104 displays the filtered communications 602, which in this example include all communications from Mike Jones and Fred Robinson. This feature is useful to participants 110 and others monitoring a conference that have a particular interest in communications 206 from a specific group of participants 110, but not in others. It should be noted that the filtering rules 124 may include any level of complexity, to include filtering based on participant 110 names, representation attributes 108, groups 122, subject text, date, time, communication 206 content, and any other identifiable factors.

Figure 7:
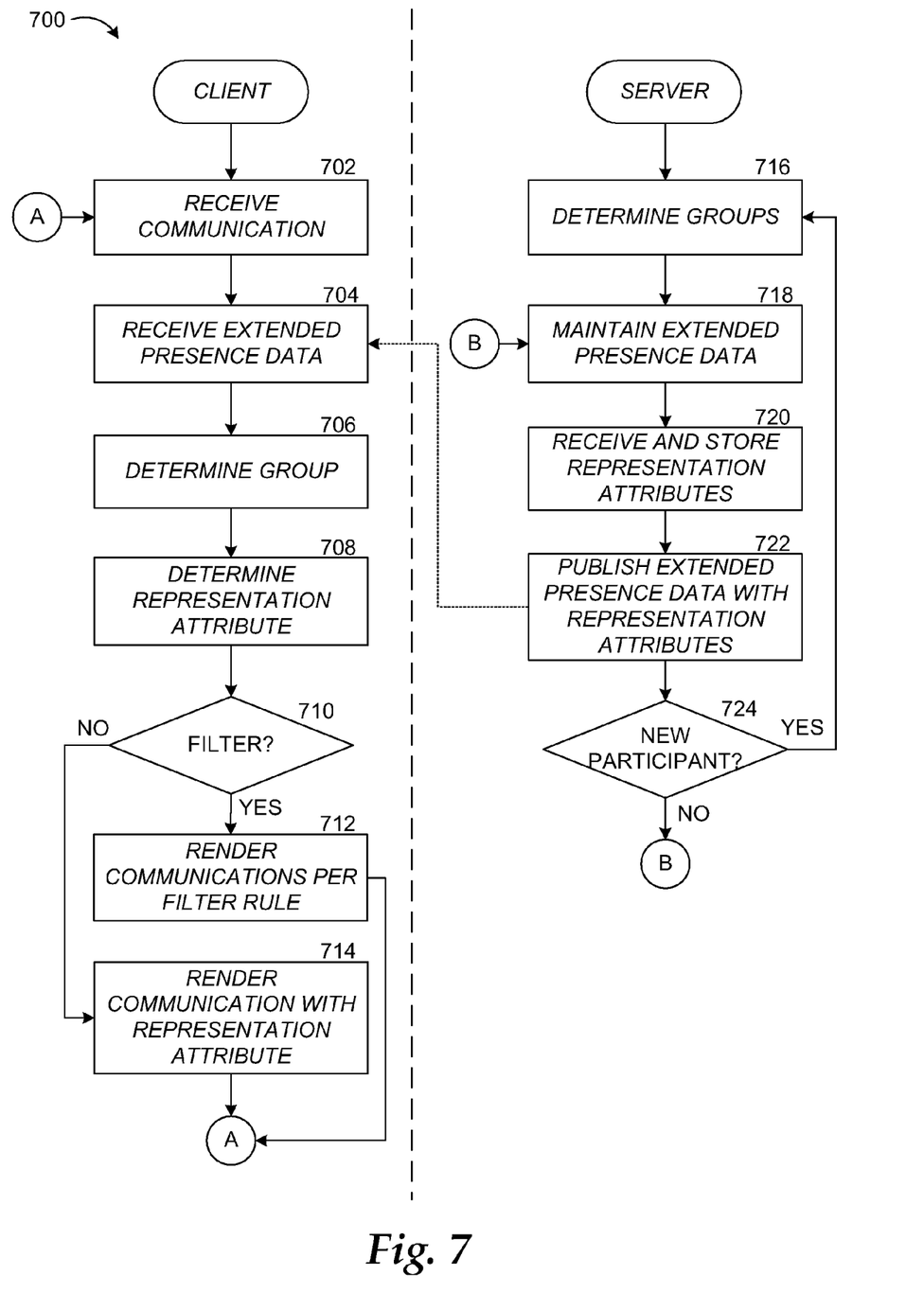
FIG. 7 is a flow diagram illustrating a method for distinguishing conference participants according to various embodiments described herein.

Referring now to FIG. 7, additional details will be provided regarding the embodiments presented herein for distinguishing conference participants 110. In particular, FIG. 7 is a flow diagram illustrating aspects of the operation of the client communications application 104 on the left side of the dotted line and aspects of the operation of the server communications application 116 on the right side of the dotted line.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The operations with respect to the client communications application 104 will first be described. The routine 700 for distinguishing conference participants 110 will be described in the context of a continuous process during a persistent conference. The routine 700 begins at operation 702, where the client communications application 104 receives a communication 206 from a participant 110. From operation 702, the routine 700 continues to operation 704, where the extended presence data 106 is received from the communications server 114. As discussed above, the extended presence data 106 includes status and group information for those participants 110 to which the information is subscribed. The extended presence data 106 may additionally include the applicable representation attributes 108 corresponding to groups 122 associated with the active conference participants 110 or to all groups 122.

The routine 700 continues from operation 704 to operation 706, where the groups 122 corresponding to the active participants 110 are determined from the extended presence data 106 or from separate group data sent from the server communications application 116. At operation 708, the client communications application 104 determines the appropriate representation attributes 108 to use when rendering the communications 206. As discussed above, the representation attributes 108 may include specific colors, text formatting, icons, and any other visual identifier for designating a communication 206 as originating from a member of a particular group 122. Also as discussed above, the representation attributes 108 may be included with the extended presence data 106 or may be separate from the extended presence data 106, such as when extended presence data 106 is not utilized or available. The client communications application 104 may reference rendering priority rules to select a representation attribute 108 for any given communication 206.

From operation 708, the routine 700 continues to operation 710, where the client communications application 104 determines whether a filtering rule 124 exists that result in any number of communications being excluded from rendering. If filtering is not desired, then the routine proceeds to operation 714, where the communication 206 is rendered with the selected representation attribute 108. The routine 700 then returns to operation 702, where another communication 206 is received and the routine 700 continues as described above. However, if it was determined that filtering has been requested at operation 710, then the routine 700 continues from operation 710 to operation 712, where the communication 206 is rendered or withheld from display according to the applicable filtering rule 124. From operation 712, the routine 700 returns to operation 702, where another communication 206 is received and the routine 700 continues as described above.

Looking now at the operations associated with the server communications application 116 during a persistent conference, the routine 700 begins at the communications server 114 at operation 716, where the server communications application 116 determines what groups 122 the conference participants 110 belong to. This determination may be an active response to a request for the information by the client communications application 104 or may be performed as a routine function in maintaining extended presence data 106 or other data related to the participants 110 of a conference. To establish the relationships between conference participants 110 and the groups 122 to which they belong, the server communications application 116 may retrieve or receive the information from the active directory 120. The active directory 120 contains information regarding persons within an organization or being provided a service. Part of this information includes the groups 122 to which they belong.

The routine 700 continues from operation 716 to operation 718, where the extended presence data 106 is maintained. As described above, as participants join and leave a conference, or alter their current status, that information is updated within the extended presence data 106. From operation 718, the routine 700 continues to operation 720, where the server communications application 116 receives and stores representation attributes 108. The representation attributes 108 may be input or updated by an administrator or any person with access and authority to designate representation attributes 108 for one or more groups 122 of participants 110.

At operation 722, the server communications application 116 publishes the extended presence data 106 with the representation attributes 108 for use by the client communications applications 104 at any number of computing devices 102 in rendering communications 206 in the manner described above to distinguish between communications 206 from various groups 122 of participants 110. From operation 722, the routine 700 continues to operation 724, where a determination is made as to whether a new participant 110 has joined the conference. If a new participant 110 has joined, then the routine 700 returns to operation 716, where any corresponding group memberships are determined and the routine 700 continues as described above. If a new participant 110 has not joined the conversation, then the routine 700 returns to operation 718, where the server communications application 116 continues to maintain the extended presence data 106 on the existing participants. The routine 700 then continues as described above.

Figure 8:
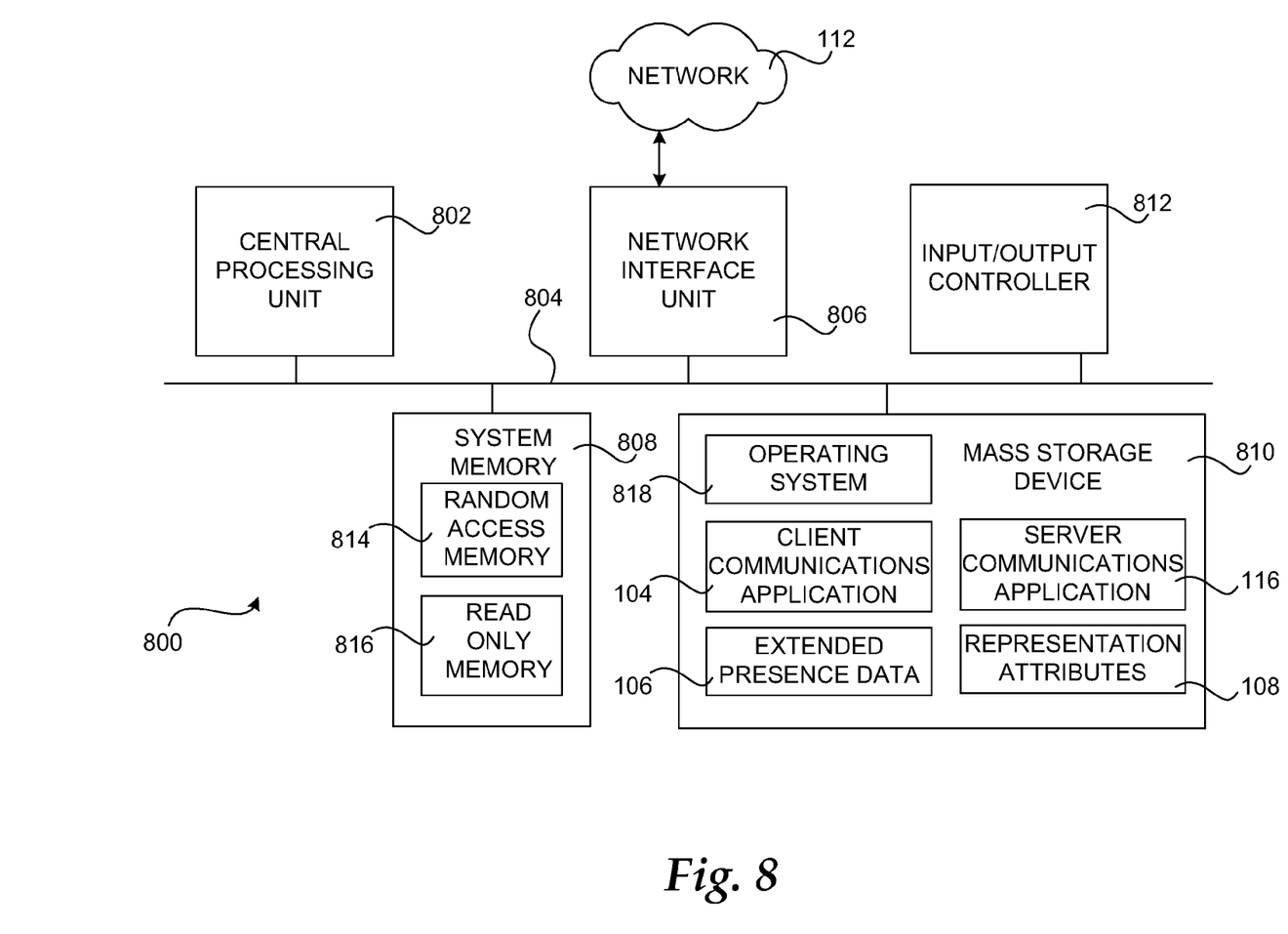
FIG. 8 is a computer architecture diagram showing an illustrative computer hardware and software architecture for a computing system capable of implementing aspects of the embodiments presented herein.

FIG. 8 shows an illustrative computer architecture for a computer 800 capable of executing the software components described herein for distinguishing conference participants 110 in the manner presented above. The computer architecture shown in FIG. 8 illustrates a conventional desktop, laptop, or server computer and may be utilized to execute any aspects of the software components presented herein described as executing on the computing device 102 or the communications server 114.

The computer architecture shown in FIG. 8 includes a central processing unit 802 (CPU), a system memory 808, including a random access memory 814 (RAM) and a read-only memory (ROM) 816, and a system bus 804 that couples the memory to the CPU 802. A basic input/output system containing the basic routines that help to transfer information between elements within the computer 800, such as during startup, is stored in the ROM 816. The computer 800 further includes a mass storage device 810 for storing an operating system 818, application programs, and other program modules, which are described in greater detail herein.

The mass storage device 810 is connected to the CPU 802 through a mass storage controller (not shown) connected to the bus 804. The mass storage device 810 and its associated computer-readable media provide non-volatile storage for the computer 800. Although the description of computer-readable media contained herein refers to a mass storage device, such as a hard disk or CD-ROM drive, it should be appreciated by those skilled in the art that computer-readable media can be any available computer storage media that can be accessed by the computer 800.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer 800.

According to various embodiments, the computer 800 may operate in a networked environment using logical connections to remote computers through a network such as the network 112. The computer 800 may connect to the network 112 through a network interface unit 806 connected to the bus 804. It should be appreciated that the network interface unit 806 may also be utilized to connect to other types of networks and remote computer systems. The computer 800 may also include an input/output controller 812 for receiving and processing input from a number of other devices, including a keyboard, mouse, or electronic stylus (not shown in FIG. 8). Similarly, an input/output controller may provide output to a display screen, a printer, or other type of output device (also not shown in FIG. 8).

As mentioned briefly above, a number of program modules and data files may be stored in the mass storage device 810 and RAM 814 of the computer 800, including an operating system 818 suitable for controlling the operation of a networked desktop, laptop, or server computer. The mass storage device 810 and RAM 814 may also store one or more program modules. In particular, the mass storage device 810 and the RAM 814 may store the client communications application 104, server communications application 116, the extended presence data 106, and the representation attributes 108, each of which was described in detail above with respect to FIGS. 1-7. The mass storage device 810 and the RAM 814 may also store other types of program modules.

Based on the foregoing, it should be appreciated that technologies for distinguishing communications 206 according to the group membership of the drafting participants 110 are provided herein. Utilizing the embodiments described herein, a user is able to quickly and efficiently monitor communications 206 within a conference that are of the most interest to the user. A user may additionally filter communications 206 as desired to view only those communications 206 from groups 122 that the user is interested in. Further, embodiments allow for a user to receive additional information, such as group membership information, in an efficient manner by hovering a cursor over a communication 206 to trigger an information window 504 that includes the desired data.

Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for distinguishing conference participants, the method comprising:
receiving a message associated with a conference participant;
determining a group of conference participants with which the conference participant is associated from a plurality of groups of conference participants with which the conference participant is associated, the group of conference participants with which the conference participant is associated being determined according to a rendering priority rule defining an order in which the plurality of groups are to be rendered;
receiving a representation attribute associated with the group, the representation attribute comprising data defining a visual format for rendering messages associated with the group on a computer display; and rendering the message on the computer display in the visual format defined by the representation attribute.

2. The method of claim 1, wherein obtaining the representation attribute comprises:
receiving extended presence data corresponding to the conference participant, the extended presence data comprising the representation attribute for rendering according to the group with which the conference participant is associated; and
retrieving the representation attribute from the extended presence data.

3. The method of claim 2, wherein receiving extended presence data corresponding to the conference participant comprises receiving extended presence data corresponding to a plurality of conference participants.

4. The method of claim 2, wherein the extended presence data further comprises a cellular telephone number associated with the conference participant.

5. The method of claim 1, wherein the representation attribute defines a color in which messages associated with the group are rendered, and wherein rendering the message in the format defined by the representation attribute comprises rendering at least a portion of the message in the color.

6. The method of claim 1, wherein the representation attribute defines a font in which messages associated with the group are rendered, and wherein rendering the message in the format defined by the representation attribute comprises rendering at least a portion of the message in the font.

7. The method of claim 1, wherein the representation attribute defines an icon associated with the group, and wherein rendering the message in the format defined by the representation attribute comprises rendering the icon with the message.

8. The method of claim 1, further comprising:
receiving a plurality of messages from a plurality of conference participants; and
selectively rendering one or more of the plurality of messages according to a filtering rule defining a group for which corresponding messages are to be concealed from display on the computer display.

9. The method of claim 1, further comprising:
in response to determining that a cursor is located proximate to the message rendered on the computer display, rendering information associated with conference participant on the computer display; and
in response to determining that the cursor has moved away from the location proximate to the message rendered on the computer display, concealing the information associated with conference participant.

10. The method of claim 9, wherein the information associated with the conference participant comprises a visual indication of one or more groups associated with the conference participant.

11. The method of claim 1, further comprising:
receiving a new representation attribute corresponding to the group; and
modifying a format of messages rendered on the computer display according to the new representation attribute.

12. A method for distinguishing conference participants, the method comprising:
determining a group of conference participants with which a conference participant is associated from a plurality of groups of conference participants with which the conference participant is associated, the group of conference participants with which the conference participant is associated being determined according to a rendering priority rule defining an order in which the plurality of groups are to be rendered;
maintaining extended presence data associated with the conference participant;
storing a representation attribute associated with the group with the extended presence data, the representation attribute defining a visual format for rendering messages associated with the group on a computer display; and
publishing the extended presence data with the representation attribute.

13. The method of claim 12, wherein associating the conference participant with the group comprises:
retrieving group membership information for the conference participant from an active directory; and
storing the group membership information with the extended presence data.

14. The method of claim 12, wherein the representation attribute defines at least one of
a color in which messages associated with the group are rendered on the computer display, or
a font in which at least a portion of text associated with the messages is rendered on the computer display.

15. The method of claim 12, wherein the representation attribute defines an icon rendered on the computer display with the messages associated with the group.

16. The method of claim 12, further comprising:
receiving an updated representation attribute associated with the group;
replacing the representation attribute with the updated representation attribute; and
republishing the extended presence data with the updated representation attribute.

17. A computer storage medium comprising one or more of an optical disk, a solid state memory device or a magnetic storage device having computer executable instructions stored thereon which, when executed by a computer, cause the computer to:
receive a message associated with a conference participant;
determine, based upon extended presence data, a group of conference participants with which the conference participant is associated from a plurality of groups of conference participants with which the conference participant is associated, the group of conference participants with which the conference participant is associated being determined according to a rendering priority rule defining an order in which the plurality of groups are to be rendered;
determine a representation attribute associated with the group, the representation attribute defining a visual format in which messages associated with the group are rendered on a computer display, the visual format comprising a visual indication that distinguishes the message from another message not associated with the group; and
render the message on the computer display in the visual format defined by the representation attribute.

18. The computer storage medium of claim 17, wherein the message comprises text and the visual format comprises at least one of a color of the text or a font in which the text is displayed.

19. The computer storage medium of claim 17, further comprising computer executable instructions stored thereon which, when executed by a computer, cause the computer to:
receive a plurality of messages from a plurality of conference participants;
display the plurality of messages on the computer display;

apply a filtering rule to the plurality of messages, the filtering rule defining a selected group for which corresponding messages are to be rendered;
render messages of conference participants associated with the selected group; and
conceal messages of conference participants that are not members of the selected group.

* * * * *